(12) United States Patent
Chen et al.

(10) Patent No.: US 10,948,162 B2
(45) Date of Patent: Mar. 16, 2021

(54) OPTICS FOR AISLE LIGHTING

(71) Applicant: ABL IP Holding LLC, Atlanta, GA (US)

(72) Inventors: Jie Chen, Snellville, GA (US); Craig Eugene Marquardt, Social Circle, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/403,928

(22) Filed: May 6, 2019

(65) Prior Publication Data

US 2019/0338917 A1   Nov. 7, 2019

Related U.S. Application Data

(60) Provisional application No. 62/667,101, filed on May 4, 2018.

(51) Int. Cl.
*F21V 7/00* (2006.01)
*F21V 5/04* (2006.01)
(Continued)

(52) U.S. Cl.
CPC ............ *F21V 7/0091* (2013.01); *F21S 8/043* (2013.01); *F21V 5/02* (2013.01); *F21V 5/04* (2013.01);
(Continued)

(58) Field of Classification Search
CPC .... F21V 5/02–04; F21V 5/008; F21V 7/0091; G02B 27/30; F21W 2131/402
See application file for complete search history.

(56) References Cited

U.S. PATENT DOCUMENTS 2,356,654 A * 8/1944 Cullman .................. F21V 5/04
                                                     362/223
3,681,591 A    8/1972 Loch
(Continued)

FOREIGN PATENT DOCUMENTS

CA    2316123 A1    3/2001
EP    1925878       5/2008

OTHER PUBLICATIONS

U.S. Appl. No. 29/646,541, Notice of Allowance, dated May 6, 2020, 6 pages.
(Continued)

*Primary Examiner* — Mariceli Santiago
(74) *Attorney, Agent, or Firm* — Kilpatrick Townsend & Stockton LLP

(57) ABSTRACT

An optic for aisle lighting includes a portion of an optical material defined by a length and a cross-sectional profile. The cross-sectional profile is characterized by a cavity within the optical material, two upwardly-facing surfaces of the optical material on opposite sides of the cavity from one another, and downwardly-facing surfaces of the optical material. The cavity is bounded by an upward facing aperture, and at least three faces of the optical material that meet at interior angles. Light received through the upward facing aperture is separated at the interior angles, and refracted by the faces of the optical material, into separate light beams equal in number to the faces. The two upwardly-facing surfaces internally reflect the separate light beams downwardly. The downwardly-facing surfaces intercept respective portions of the separate light beams, and refract the portions as they exit the optic.

10 Claims, 10 Drawing Sheets

(51) Int. Cl.
    *F21S 8/04*             (2006.01)
    *G02B 3/02*            (2006.01)
    *G02B 27/30*          (2006.01)
    *F21V 5/02*            (2006.01)
    *F21W 131/402*       (2006.01)
    *F21Y 115/10*         (2016.01)

(52) U.S. Cl.
    CPC ............... *G02B 3/02* (2013.01); *G02B 27/30* (2013.01); *F21W 2131/402* (2013.01); *F21Y 2115/10* (2016.08)

(56) References Cited

U.S. PATENT DOCUMENTS

| | | | |
|---|---|---|---|
| 3,721,818 A | 3/1973 | Stahlhut | |
| 6,575,582 B2* | 6/2003 | Tenmyo | G03B 15/05 362/16 |
| 7,431,480 B2 | 10/2008 | Godo | |
| D632,419 S | 2/2011 | Ng et al. | |
| 7,942,559 B2 | 5/2011 | Holder et al. | |
| D643,148 S | 8/2011 | Jabra et al. | |
| D644,780 S | 9/2011 | Jabra et al. | |
| 8,430,538 B2 | 4/2013 | Holder et al. | |
| 8,449,150 B2 | 5/2013 | Allen et al. | |
| 8,506,122 B2 | 8/2013 | Bak et al. | |
| 8,525,206 B2 | 9/2013 | Blumel et al. | |
| D701,990 S | 4/2014 | Rodgers et al. | |
| 8,777,457 B2 | 7/2014 | Holder et al. | |
| 8,814,392 B1 | 8/2014 | Lipowsky et al. | |
| 8,864,346 B2 | 10/2014 | Chinniah et al. | |
| 8,870,417 B2 | 10/2014 | Pickard et al. | |
| 8,915,611 B2 | 12/2014 | Zhang | |
| D738,030 S | 9/2015 | Martins et al. | |
| D738,563 S | 9/2015 | Martins et al. | |
| 9,291,330 B2 | 3/2016 | Yang et al. | |
| 9,482,394 B2 | 11/2016 | Holder et al. | |
| 9,488,330 B2 | 11/2016 | Pickard et al. | |
| D787,732 S | 5/2017 | Parker et al. | |
| 9,683,715 B2 | 6/2017 | Min | |
| 9,714,754 B2 | 7/2017 | Spinger et al. | |
| 9,765,944 B2 | 9/2017 | Dureiko | |
| D806,939 S | 1/2018 | Klus | |
| D808,577 S | 1/2018 | Klus | |
| 9,857,052 B2 | 1/2018 | Mallory et al. | |
| 9,857,952 B2 | 1/2018 | Stewart | |
| D818,627 S | 5/2018 | Santoro et al. | |
| D819,250 S | 5/2018 | Ji | |
| 10,190,746 B1* | 1/2019 | Mao | F21V 5/04 |
| D870,956 S | 12/2019 | Mier-langner et al. | |
| 10,641,442 B2* | 5/2020 | Kang | F21V 17/005 |
| 2003/0007359 A1* | 1/2003 | Sugawara | F21V 5/00 362/326 |
| 2012/0113621 A1 | 5/2012 | Lee et al. | |
| 2014/0376220 A1 | 12/2014 | Shen et al. | |
| 2015/0062898 A1 | 3/2015 | Rizkin et al. | |
| 2015/0345738 A1* | 12/2015 | Zhang | F21V 5/04 362/308 |
| 2015/0362153 A1* | 12/2015 | Ming | F21V 5/046 362/235 |
| 2016/0238202 A1 | 8/2016 | Mallory et al. | |
| 2017/0167665 A1 | 6/2017 | Germain et al. | |
| 2019/0063694 A1* | 2/2019 | Kang | F21V 5/045 |

OTHER PUBLICATIONS

U.S. Appl. No. 29/646,543, Notice of Allowance, dated May 15, 2020, 8 pages.

Application No. CA3,042,310, Office Action, dated May 7, 2020, 4 pages.

* cited by examiner

OPTICS FOR AISLE LIGHTING

CROSS-REFERENCE TO RELATED APPLICATIONS

This is a non-provisional application of, and claims the benefit of priority to, U.S. Provisional Patent Application No. 62/667,101 filed 4 May 2018 and entitled "Optics For Aisle Lighting," which is incorporated herein by reference in its entirety and for all purposes.

BACKGROUND

Many present day light fixtures for interior lighting are designed to provide general lighting in wide patterns from incandescent bulbs. Reasons that wide patterns are typical include the low historical costs of energy and the size of incandescent bulbs. In recent years, light emitting diodes (LEDs) have emerged as cost competitors to incandescent bulbs due to increased energy costs and the realization that much of the energy consumed by incandescent bulbs becomes waste heat that must be removed. LEDs are also much smaller light emitters than incandescent bulbs, enabling optical arrangements that provide greater flexibility in the placement of emitted light while keeping overall system size, weight and cost low.

SUMMARY

An optic for aisle lighting includes a portion of an optical material defined by a length and a cross-sectional profile orthogonal to the length. The cross-sectional profile is characterized by an upper side of the cross-sectional profile forming a cavity within the optical material, two upwardly-facing surfaces of the optical material on opposite sides of the cavity from one another, and downwardly-facing surfaces of the optical material. The cavity is bounded by an upward facing aperture, and at least three faces of the optical material that meet at interior angles. When light is received through the upward facing aperture of the cavity, the light is separated at the interior angles, and refracted by the faces of the optical material, into a plurality of separate light beams that are equal in number to the faces of the optical material. Each of the two upwardly-facing surfaces is configured to internally reflect respective ones of the separate light beams downwardly, as compared with their original directions. Each of the downwardly-facing surfaces intercepts at least a portion of one of the separate light beams, and refracts the portion of the one of the separate light beams as it exits the optic.

A method of providing light for an illuminated space includes providing a linear light source that is configured to emit light downwardly, and providing a linear optic. The linear optic includes an optical material that defines a length and a cross-sectional profile orthogonal to the length. The cross-sectional profile is characterized by an upper side of the cross-sectional profile forming a cavity within the optical material, two upwardly-facing surfaces of the optical material on opposite sides of the cavity from one another, and downwardly-facing surfaces of the optical material. The cavity is bounded by an upward facing aperture, and at least three faces of the optical material that meet at interior angles. When light is received through the upward facing aperture of the cavity, the light is separated at the interior angles, and refracted by the faces of the optical material, into a plurality of separate light beams that are equal in number to the faces of the optical material. Each of the two upwardly-facing surfaces is configured to internally reflect respective ones of the separate light beams downwardly, as compared with their original directions. Each of the downwardly-facing surfaces intercepts at least a portion of one of the separate light beams, and refracts the portion of the one of the separate light beams as it exits the optic. The faces of the optical material, the two upwardly-facing surfaces of the optical material on opposite sides of the cavity, and the downwardly-facing surfaces of the optical material are arranged so as to redirect light that exits the linear optic away from nadir, and to concentrate the light that exits the optic into one or more output beams, each of the one or more output beams being centered about respective angles that are higher than nadir.

BRIEF DESCRIPTION OF THE DRAWINGS

Embodiments are described in detail below with reference to the following figures, in which like numerals within the drawings and mentioned herein represent substantially identical structural elements.

DETAILED DESCRIPTION

Figure 1:
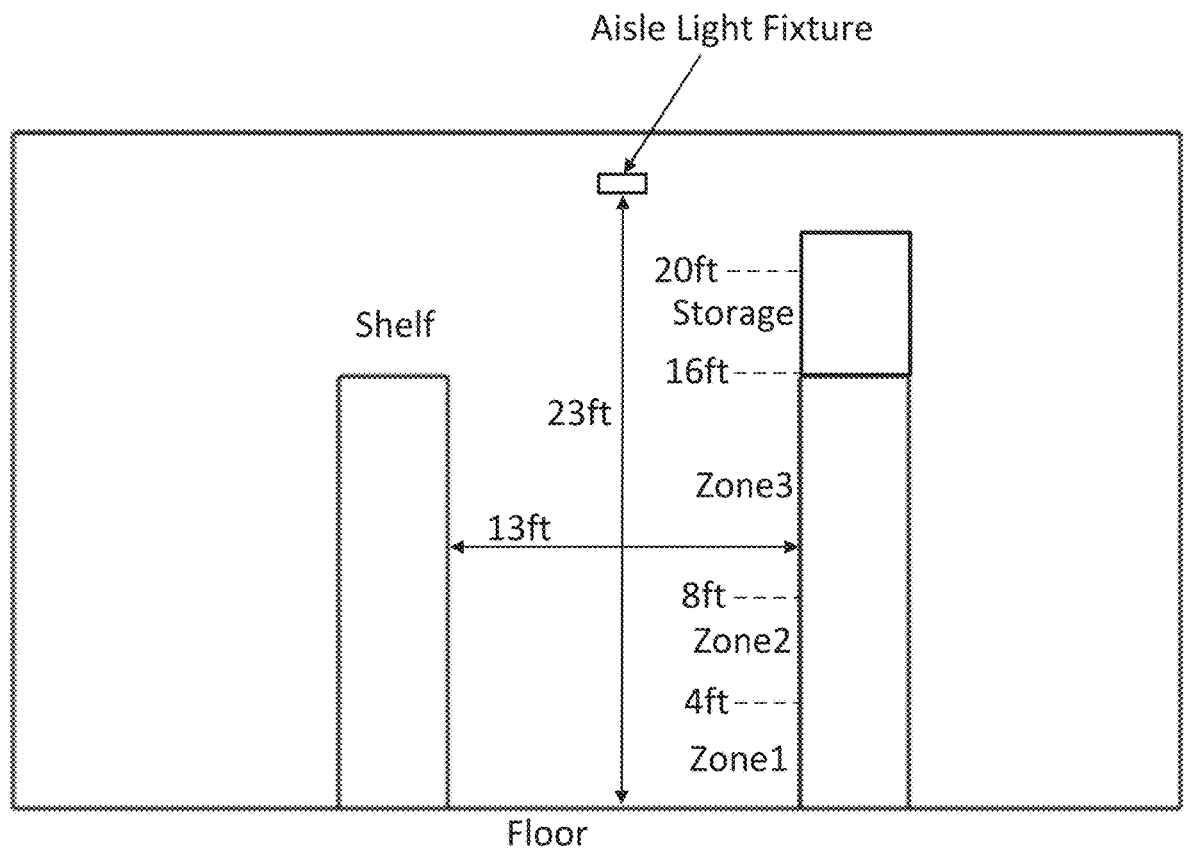
FIG. 1 schematically illustrates an aisle lighting application, according to one or more embodiments.

The subject matter of embodiments of the present invention is described here with specificity to meet statutory requirements, but this description is not intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Each example is provided by way of illustration and/or explanation, and not as a limitation. For instance, features illustrated or described as part of one embodiment may be used on another embodiment to yield a further embodiment. Upon reading and comprehending the present disclosure, one of ordinary skill in the art will readily conceive many equivalents, extensions, and alternatives to the specific, disclosed luminaire types, all of which are within the scope of embodiments herein.

In the following description, positional terms like "above," "below," "vertical," "horizontal" and the like are sometimes used to aid in understanding features shown in the drawings as presented, that is, in the orientation in which labels of the drawings read normally. These meanings are adhered to, notwithstanding that optics and/or light fixtures herein may be mounted to surfaces that are not horizontal.

Disclosed herein are optics that may be used with compact light emitters, such as LEDs, to provide targeted illumination for areas where light is desirably aimed at certain areas while avoiding others. One particularly useful example is for lighting in stores having aisles, with goods for sale in shelves facing the aisles. Certain embodiments herein provide linear optics that direct light to shelves that face aisles through which retail customers can walk. For example, FIG. 1 schematically illustrates an aisle lighting application in which an aisle light fixture is expected to be at a height of about 23 feet, and is centered between two shelf units that are each at least 16 feet in height, and about 13 feet across the aisle from one another. The heights and distances given are exemplary only, in order to illustrate the concepts herein, and the optics used can be adapted to other aisle configurations, as further discussed below.

In the example of FIG. 1, a retailer responsible for the illustrated aisle and shelving may have requirements for presentation and lighting of items on the shelves. For example, this retailer may consider the shelving to span several zones. In FIG. 1, these zones are illustrated as a zone 1 being at floor height to a maximum height of 4 feet, a zone 2 being from 4 to 8 feet in height, a zone 3 being from 8 to 16 feet in height, and anything above 16 feet being considered as a storage zone. The retailer seeks lighting that is consistent up and down the aisle (e.g., into and out of the plane of FIG. 1), and that provides a great deal of light in zone 2 (thought of as the "sell zone"), some light in zones 1 and 3 and the storage zone, and very little light on the floor. A great deal of light reaching the floor directly from the light fixture may be considered undesirable because if a customer looks upward and/or toward the light fixture, the light may be painful to look at directly, and thus form a nuisance. The retailer's preference may therefore be that no light, or only a small amount of light, be directed from the light fixture toward the floor, knowing that the shelves and goods thereon will also reflect some light toward the floor to light a customer's way down the aisle.

One way to provide lighting according to the noted retailer's preference for the aisle shown in FIG. 1, is to use a linear light fixture that provides a row of light sources along the direction of the aisle, and that uses optics to divert desired amounts of light toward the various directions. The light sources may be of any type, but are typically LEDs arranged on a circuit board along one or more rows, so that the optics and the entire light fixture can be small for reduced manufacturing costs, weight and the like.

Figure 2:
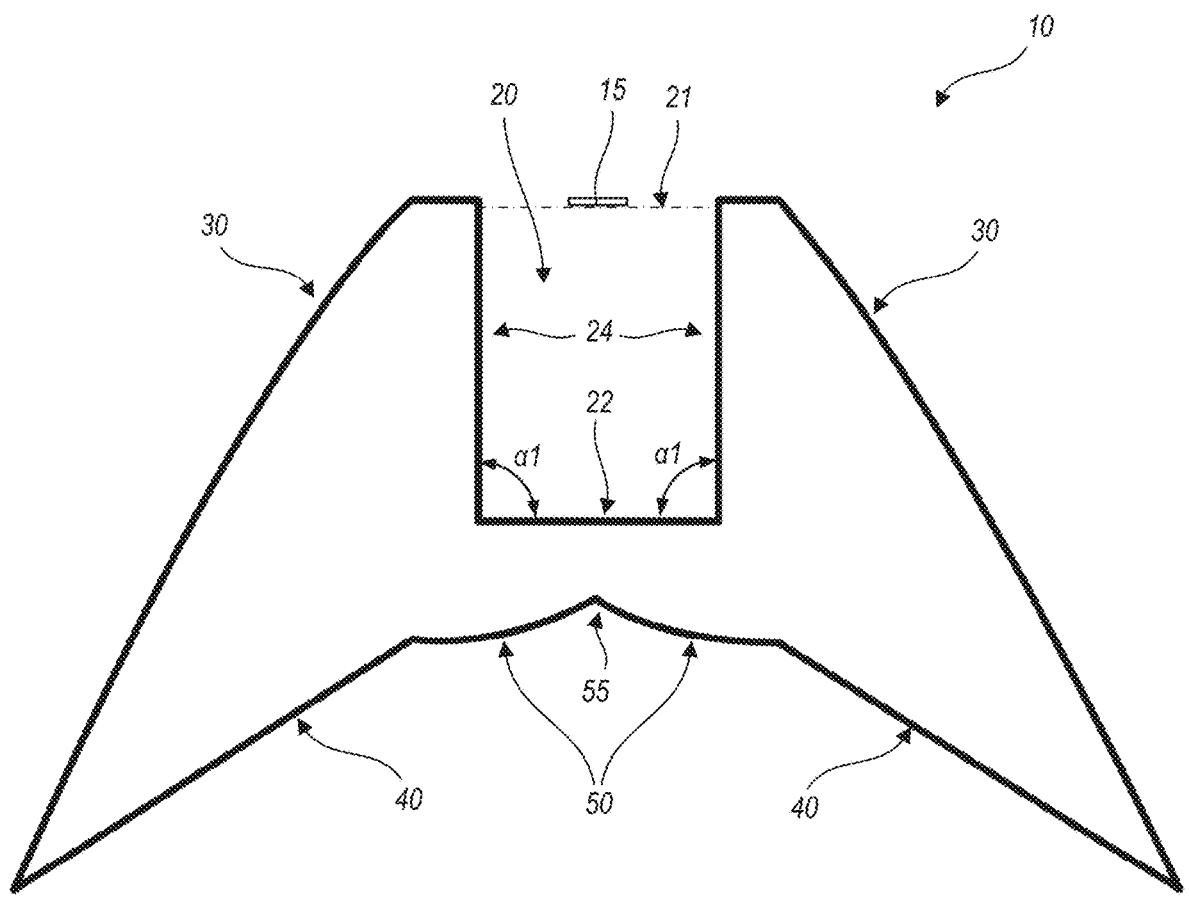
FIG. 2 schematically illustrates a cross-sectional profile of an optic that provides a useful distribution of light along an aisle, according to an embodiment.

FIG. 2 schematically illustrates a cross-sectional profile of an optic 10 that provides a useful distribution of light along an aisle. Optic 10 is formed of an optical material such as glass, polycarbonate, acrylic, silicone or the like and may be fabricated by extrusion, molding, casting or the like. Optic 10 extends in and out of the plane of FIG. 2 (e.g., along the direction of an aisle). The following discussion analyzes the performance of optic 10 at a single cross-sectional plane. In practice, optic 10 may include mounting features and the like integrally fabricated with a linear section having the cross-section shown in FIG. 2 (e.g., by molding). Alternatively, optic 10 may be first formed by extrusion, and later modified by machining to add mounting features. When such mounting features are confined to a small percentage of a length of optic 10 (e.g., less than 10%, less than 5% or less than 2%), effects of such mounting features on the optical distributions produced are correspondingly small.

Optical material of optic 10 forms side faces 24 and a bottom face 22 of a light input cavity 20, which is bounded on an upper side thereof by an upward facing aperture 21, as shown. Optic 10 is configured to couple with one or more light sources 15 along the direction of the aisle such that each light source 15 emits light downwardly through aperture 21 into light input cavity 20. Each light source 15 may be centered between side faces 24, as shown in FIG. 2, but this is not required. In certain embodiments, light sources 15 are LEDs, but this, also, is not required. Faces 24 and 22 as shown in FIG. 2 may be straight (e.g., planes in and out of the plane of FIG. 2) but this, also, is not required. Faces 22 and 24 of the optical material advantageously meet at interior angles, denoted as $\alpha 1$ in FIG. 2 so that the light from light sources 15 refracts into separate light beams (e.g., see FIG. 3). In optic 10, angles $\alpha 1$ are ninety degrees, but in other embodiments, angles $\alpha 1$ can vary from eighty to one hundred ten degrees, or other angles as needed, to control aspects of optic 10 such as refracted beam direction, optical material usage, to facilitate molding or extrusion, and the like. However, the concept of surfaces meeting "at angles" does not preclude a small radius of curvature where the surfaces meet, as a matter of normal manufacturing tolerances, As used herein, any two surfaces are said to meet "at angles" when a radius of curvature formed where the respective surfaces adjoin is less than one-tenth of the length of either of such surfaces. Also, forming a finite but small radius of curvature can advantageously provide a small amount of light refraction in other directions for the purpose of providing some light in areas other than the main output lobes, as discussed further below.

Optic 10 also forms upwardly-facing, internal reflection surfaces 30, downwardly-facing surfaces 40 and one or more additional, downwardly-facing surfaces 50, as also shown in FIG. 2. In this disclosure, "upwardly-facing" and "downwardly-facing" are meant in the sense of directions that the corresponding surfaces present externally, as shown in the drawings herein, irrespective of the direction of light meeting or leaving such surfaces. Surfaces that would be visible in a plan view from above are deemed "upwardly-facing" while those that would be visible in a plan view from below are deemed "downwardly-facing." Thus, surfaces 30 are upwardly-facing, while faces 40 and 55 are downwardly-facing. For convenience, downwardly-facing surfaces through which light exits optics may be called output surfaces herein.

In the illustrated embodiment, downwardly-facing output surfaces 50 meet at a center point 55. It is not required that center point 55 form an angle, as shown in FIG. 2, but certain advantages can be realized from a center point 55 being an angle and/or a small radius transition, as discussed further below.

By forming input cavity 20 with faces 24 and 22 meeting at angles $\alpha 1$, optic 10 advantageously splits light that emits from light sources 15 into three separate light beams. The resulting, separate light beams are conveniently redirected by further optical surfaces, as described below, so that substantially all of the light from light sources 15 can be targeted as desired.

Although not a critical feature, it is advantageous for optic 10 to split the light from a linear light source into separate beams. Splitting the light allows optic 10 to use smaller, less numerous reflective surfaces, and/or volumes of refractive material, to control separate beams, than an optic that attempts to control such light without breaking it into separate beams. For example, LED chips are considered Lambertian emitters that provide at least some light over a 180 degree angular range, with the most intense light being emitted directly normal to an output surface of the LED chip. A single refractive optic that would wrap around the LED chip and refract the light from the chip into a single narrow lobe, would either fail to capture some marginal rays from the LED chip, would not be able to focus the light into a single narrow lobe, or both, and/or would be quite large. A reflector (e.g., a parabolic retroreflector) could capture and collimate most of the light, but may either be large (or, again, risk losing quite a bit of light by reflecting a central portion straight back at the LED chip), present challenges due to mounting and/or alignment of the LED chip relative to the reflector, or require further optic(s) to gather the reflected light and provide the desired output beams. As described herein, optics of minimal size can split substantially all of an entire Lambertian distribution into separate light beams, and can further reflect and/or refract the separate beams into very narrow output lobes with a single optic.

The following explanation illustrates one example of shaping light from a linear light source into one or more extremely narrow output lobes that provide excellent lighting for shelves along aisles, but it should be understood that other distributions (e.g., different numbers, widths and light output angles) of output lobes can be achieved from similar optics, using the concepts disclosed herein. Upon reading and comprehending the present disclosure, one of ordinary skill in the art will readily conceive many equivalents, extensions, and alternatives.

Figure 3:
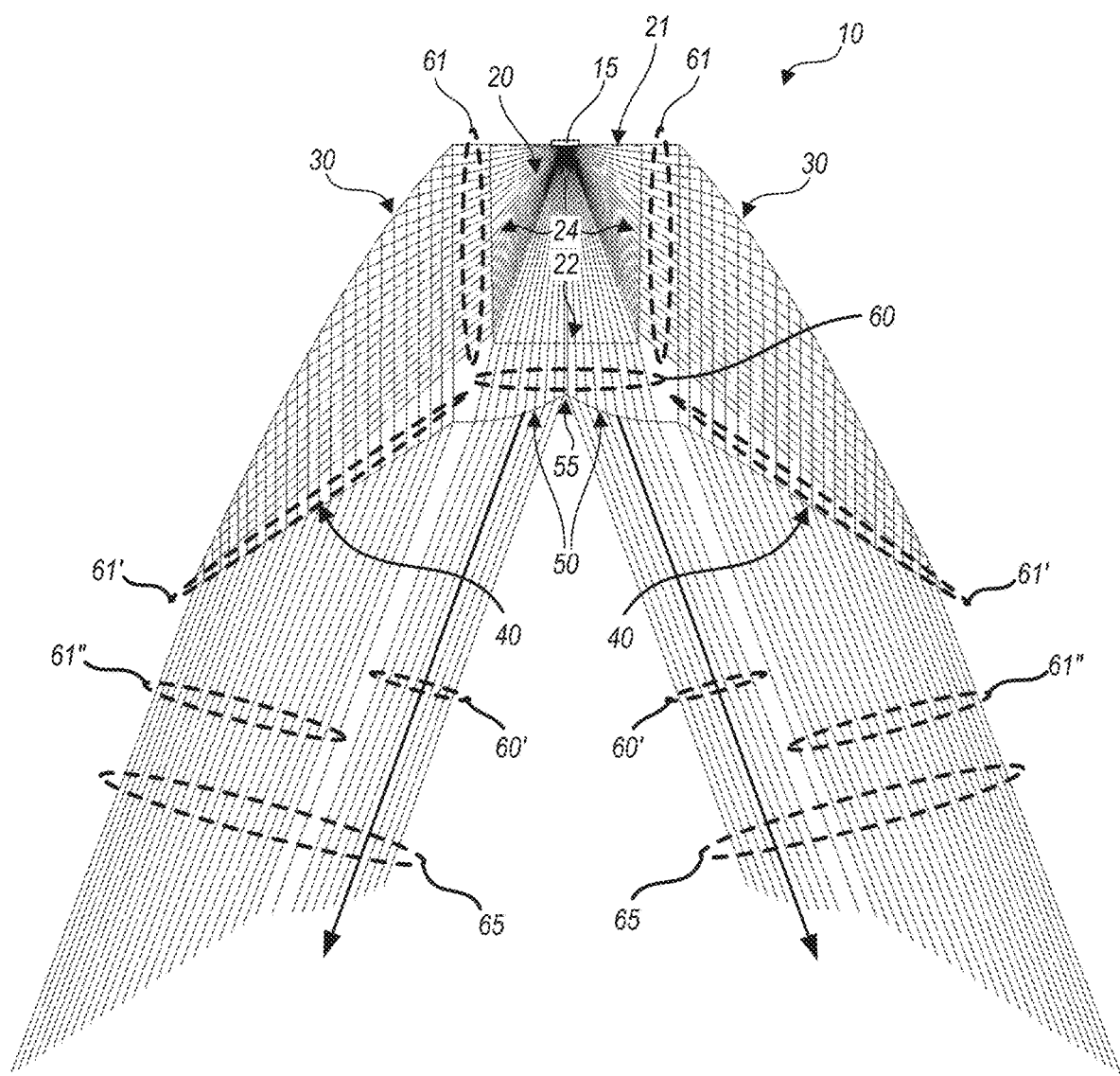
FIG. 3 is a raytrace diagram illustrating performance of the optic of FIG. 2.

FIG. 3 is a raytrace diagram illustrating performance of optic 10. Light emitted from light source 15 at various polar angles (e.g., where 90 degrees is zenith and zero degrees is nadir) enters cavity 20 through aperture 21, and is refracted as it passes through faces 22 and 24, into separate light beams 60 and 61 respectively (in optic 10, faces 24 on each side are symmetric, so light beams 61 are equal but in opposite directions on each side). Advantageously, when faces 22 and/or 24 are planar, refractions at faces 24 serve to reduce beam spreads of light beams 60 and 61 so that further optical beam shaping is easier (e.g., the sizes of further reflective and/or refractive surfaces can be reduced) than if the beam spreads of light beams 60 and 61 were not reduced.

Each light beam 61 traveling toward its respective side is reflected by a corresponding, upwardly-facing, internal reflection surface 30 to form a reflected light beam 61'. Surfaces 30 may reflect light beams 61 through total internal reflection, or may be coated with a reflective material (e.g., metal) to enhance reflection. Because rays within each light beam 61 form a known distribution of angles at each point of incidence upon surface 30, surface 30 can be shaped to reflect light beam 61 into a further, known distribution of angles. Advantageously, surfaces 30 further reduce the beam spreads of light beams 61' reflected therefrom, to facilitate further beam shaping with smaller and/or simpler optical surfaces. However, other embodiments do not reduce beam spread at surfaces that are similar to surface 30. In the case of optic 10, surfaces 30 are shaped to collimate each reflected light beam 61', that is, all rays within light beams 61' are nominally parallel, however this is not required. Also in the case of optic 10, the angle of light beams 61' within optic 30 is toward nadir, but this, also, is not required.

Upon passing out of optic 10 through downwardly-facing output surfaces 40, light beams 61' are again refracted to form output light beams 61", as shown. In optic 10, output surfaces 40 are flat so as to refract the collimated light beams 61' through identical angles, to form output light beams 61" at identical angles at all points along output surfaces 40. Thus, output light beams 61" are highly directional, despite having been originally emitted from light source 15 along a spread of angles. The particular direction in which output light beams 61" are emitted is about 21 degrees from nadir. Other angles can be achieved by providing first output surfaces 40 with different angles than the angle shown, and/or by using a material of a different refractive index.

Like light beams 61, light beam 60 includes rays at a known distribution of angles caused by the refraction of rays from light source 15 through input face 22. These rays are further refracted by downwardly-facing output surfaces 50, as shown, which are arranged to refract the rays into parallel rays forming output beams 60'. Although the embodiment illustrated as optic 10 forms output beams 60' as having parallel rays, this is not required, the relative spreads of output beams 60' can be shaped as desired by providing output surfaces 50 with different shapes. Because it is desired to split output beams 60' toward sides of optic 10, second output surfaces 50 meet at center point 55. It will be appreciated by those skilled in optics that when center point 55 is an angle (e.g., forming a radius of curvature of zero), output beams 60' will cleanly split, with no light emitted toward nadir. Alternatively, center point 55 may be a region where second output surfaces 50 adjoin a transition region with a finite, but small, radius of curvature. In this case, some rays of light beam 60 will not be cleanly split, but will refract through each portion of the transition region, scattering some light through angles around nadir. This can be advantageous in cases where it is desired to scatter a small amount of light into directions other than the directions of the main output lobes.

In the example shown in FIG. 3, the slopes of output surfaces 50 are calculated so as to refract each ray that reaches each output surface 50 toward a 21 degree angle. Thus, output beams 60' are directed toward the same angle as output light beams 61". This causes the net light output from optic 10, shown as output beams 65, to be highly directional.

By splitting the input light from light source 15 into manageable, separate light beams and re-shaping each separate light beam with the combination of refractions and internal reflection shown, optic 10 is quite small in size. For example, a net, outside to outside edge width of optic 10 may be about 28 mm, and a top to bottom height of optic 10 may be about 16.6 mm. No prior art optics that capture the full Lambertian distribution of a light emitter and shape it into highly directional output like output beams 65, in as small an optic, are known to the present inventors.

Figure 4:
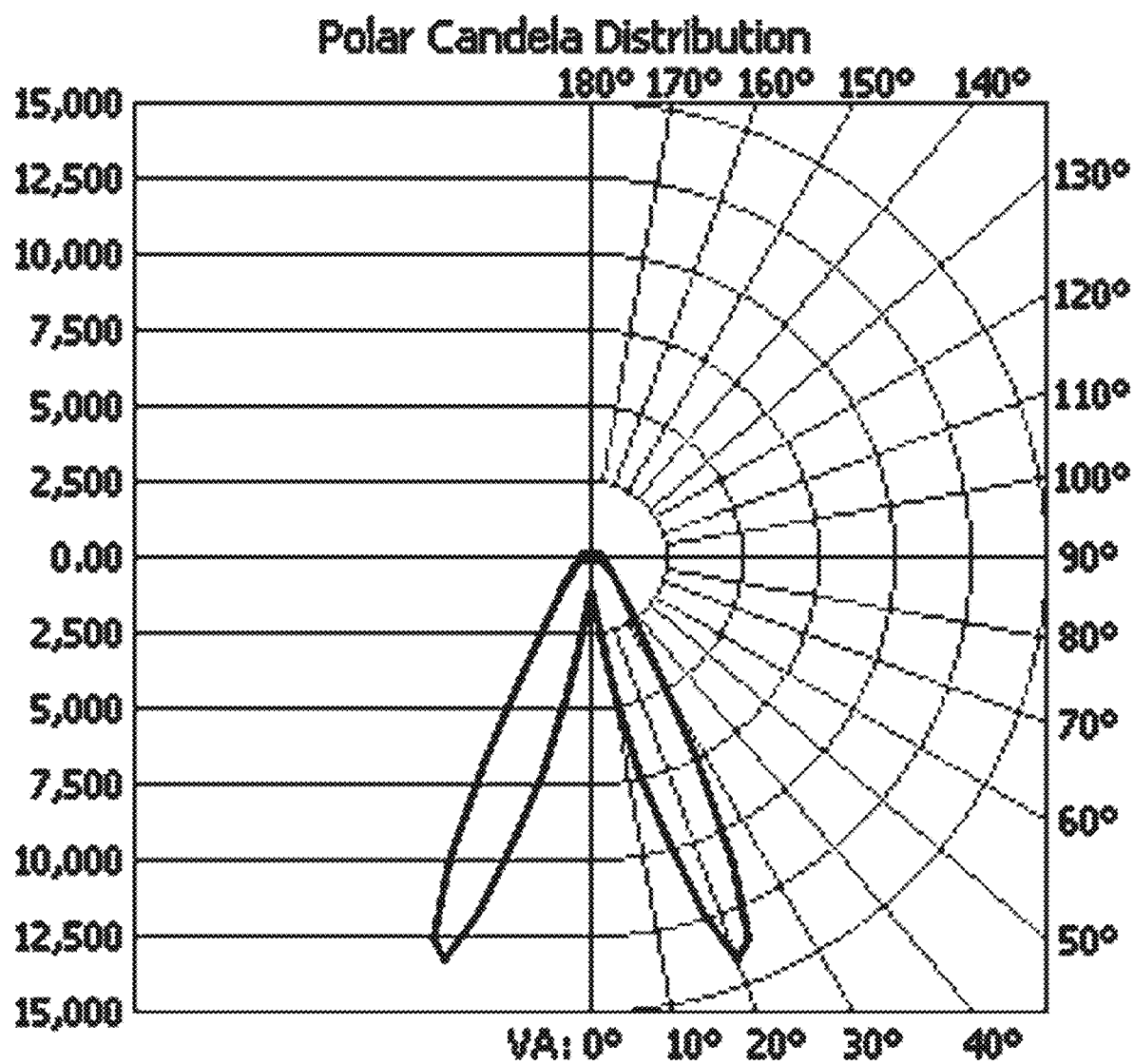
FIG. 4 is a polar plot of an intensity distribution created when a light source emits light that is redirected by the optic of FIG. 2.

FIG. 4 is a polar plot of an intensity distribution created when light source 15 emits light that is redirected by optic 10, as illustrated in FIGS. 2 and 3. As expected, the intensity peaks at 21 degree angles on either side of nadir.

It should be noted that the raytrace diagram shown in FIG. 3 and the polar plot of FIG. 4 assume that all light from light source 15 originates at a point that is centered within uppermost edges of light input cavity 20. Use of light sources that have a lateral and/or vertical size within light input cavity 20 will lead to rays that do not conform exactly to those shown in FIG. 3. These effects are minimal while light source 15 is, for example, of negligible height within light input cavity 20, and has a width less than about one-half of a width of the uppermost edges of light input cavity 20. For purposes of defining optic 10, it is sufficient to assume that light is received through an upward facing aperture (e.g., aperture 21) of the cavity and that such upward facing aperture can be defined as beginning immediately below a physical extent of the light source.

Figure 5:
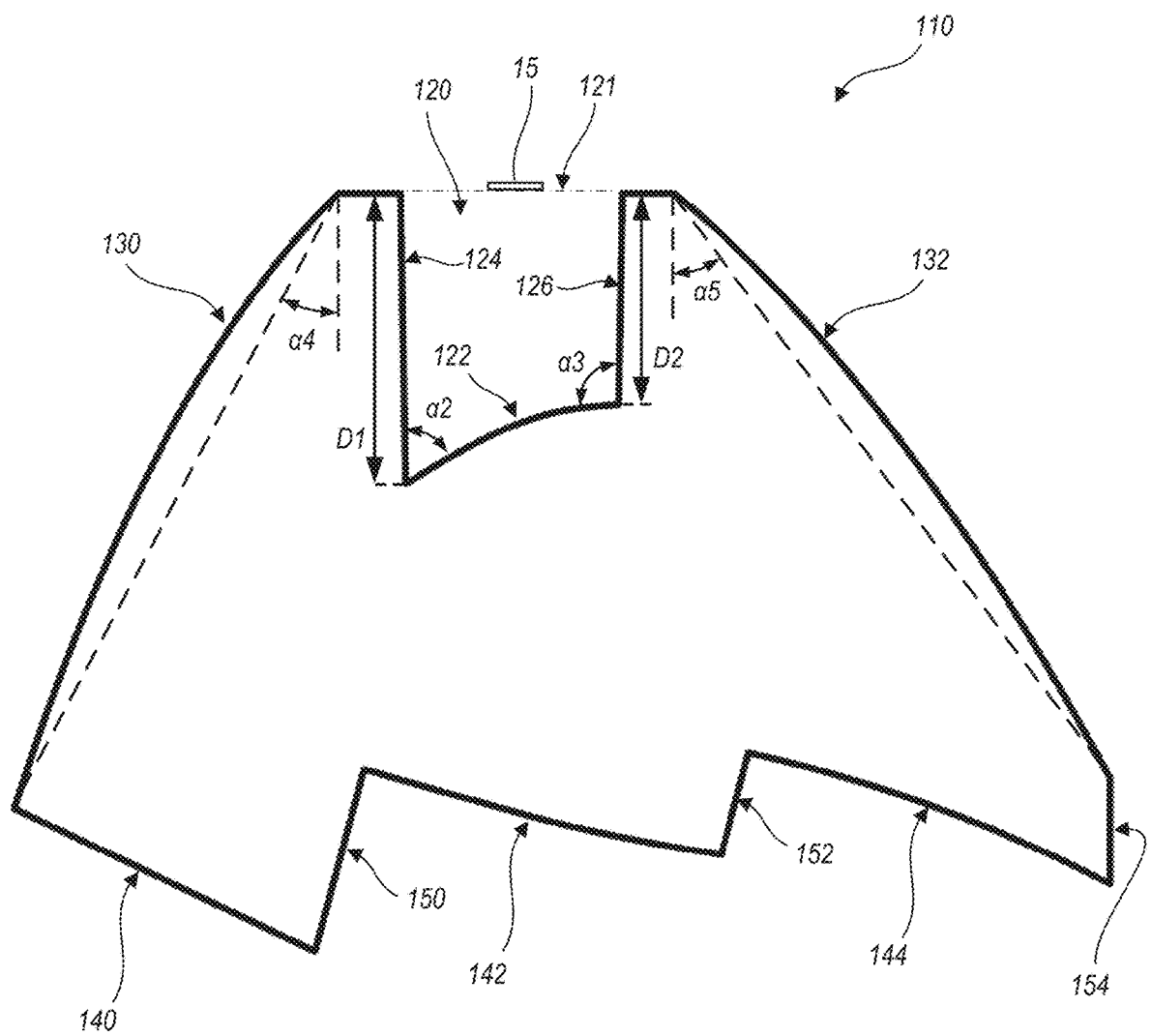
FIG. 5 schematically illustrates a cross-sectional profile of an optic that provides a useful distribution of light along an aisle, according to one or more embodiments.

Similar techniques to those discussed above can be utilized to achieve asymmetric light distributions. For example, FIG. 5 schematically illustrates a cross-sectional profile of an optic 110 that provides a useful distribution of light along one side of an aisle. Optic 110 is formed of an optical material such as glass, polycarbonate, acrylic, silicone or the like and may be fabricated by extrusion, molding, casting or the like. Optic 110 extends in and out of the plane of FIG. 5 (e.g., along the direction of an aisle). The following discussion analyzes the performance of optic 10 at a single cross-sectional plane. In practice, optic 10 may include mounting features and the like integrally fabricated with a linear section having the cross-section shown in FIG. 2 (e.g., by molding). Alternatively, optic 110 may be first formed by extrusion, and later modified by machining to add mounting features. When such mounting features are confined to a small percentage of a length of optic 10 (e.g., less than 10%, less than 5% or less than 2%), effects of such mounting features on the optical distributions produced are correspondingly small.

Figure 6A:
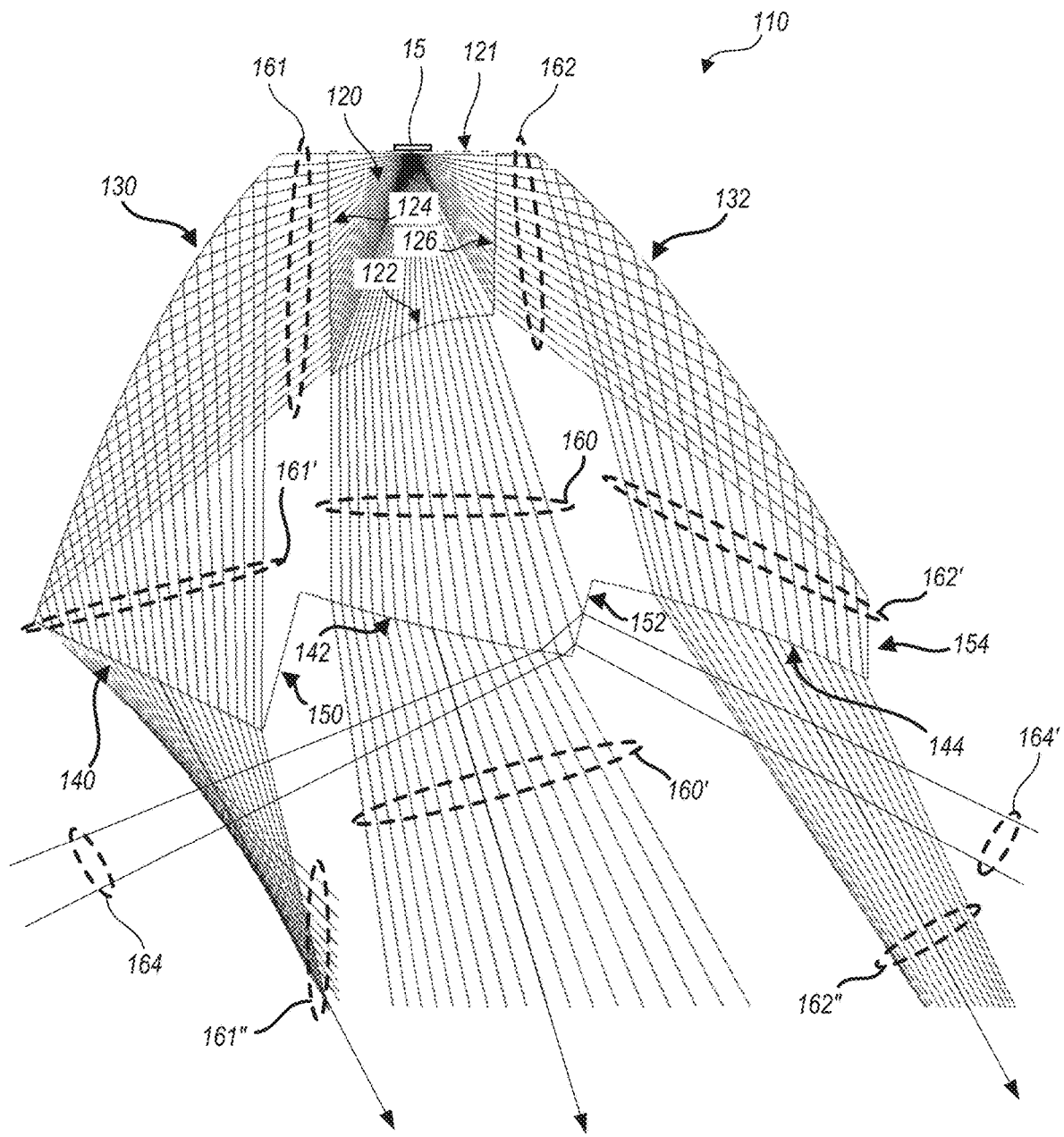
FIG. 6A is a raytrace diagram illustrating performance of the optic of FIG. 5.

Optical material of optic 110 forms side faces 124 and 126, and a bottom face 122 of a light input cavity 120, which is bounded on an upper side thereof by an upward facing aperture 121, as shown. Optic 110 is configured to couple with light sources 15 along the direction of the aisle such that each light source 15 emits light downwardly through aperture 121 into light input cavity 120. Each light source 15 may be centered between faces 124 and 126, as shown in FIG. 5, but this is not required. In certain embodiments, light sources 15 are LEDs, but this, also, is not required. Faces 124 and 126 of the optical material are shown in FIG. 5 as straight (e.g., planes in and out of the plane of FIG. 5) but this also is not required. Face 122 forms an upwardly convex surface, for reasons described below, but this also is not required. Faces 124 and 126 of the optical material advantageously meet face 122 at angles, denoted as α2 and α3 in FIG. 5, so that light from light sources 15 refracts into separate light beams (e.g., see FIG. 6A). Angles α2 and α3 can vary as needed to control aspects of optic 110 such as refracted beam direction, optical material usage, to facilitate molding or extrusion, and the like. Optic 110 forms upwardly-facing, internal reflection surfaces 130 and 132, downwardly-facing output surfaces 140, 142 and 144, and transition surfaces 150 and 152 joining the output surfaces, as also shown in FIG. 5. Internal reflection surfaces 130 and 132 form average angles α4 and α5 from vertical, as shown. Internal reflection surface 132, nearest to face 126, forms a greater angle α5 from vertical than average angle α4 of internal reflection surface 130 (nearest to face 124), as shown. As shown in FIG. 6A, the average angles α4 and α5 from vertical, and the arrangement of face 122 relative to longer and shorter faces 124 and 126 respectively, cause redirection of light beams in similar directions relative to nadir, rather than such beams exiting toward opposite horizontal directions. Internal reflection surface 132 is joined to output surface 144 through a step 154, as shown, but this is not required. In other embodiments, an internal reflection surface such as surface 132 may join directly to an output surface such as surface 144.

Similar to optic 10 illustrated in FIGS. 2 and 3, by forming input cavity 120 with faces 124 and 126, and face 122, optic 110 advantageously splits light that emits from light sources 15 into three separate light beams. The resulting, separate light beams are conveniently redirected by further optical surfaces, as described below, so that the light from light sources 15 can be targeted as desired. The following explanation illustrates one example of such targeting, but it should be understood that other distributions (e.g., light output angles) of light emission from optic 110 can be achieved.

Similar to the above explanation in connection with optic 10, it is advantageous for optic 110 to split the light from a linear light source into separate beams. This allows optic 110 to use smaller, less numerous reflective surfaces, and/or volumes of refractive material, to control separate beams, than an optic that attempts to control light from such a light source without breaking it into separate beams. By splitting the input light from light source 15 into manageable, separate light beams and re-shaping each separate light beam with the combination of refractions and internal reflection shown, optic 110 is quite small in size. For example, a net, outside to outside edge width of optic 110 may be about 28.3 mm, and a top to bottom height of optic 10 may be about 19.5 mm. No prior art optics that capture the full Lambertian distribution of a light emitter and shape it into highly directional output like output beam 165, in as small an optic, are known to the present inventors.

As described below, a single optic 110 of minimal size can split an entire Lambertian distribution into separate light beams, and further reflect and/or refract the separate beams into one or more narrow output lobes.

FIG. 6A is a raytrace diagram illustrating performance of optic 110. Light emitted from light source 15 enters cavity 120 through aperture 121 at various polar angles, and is refracted as it passes through faces 122, 124 and 126 of the optical material, into light beams 160, 161 and 162 respectively. In optic 110, faces 124 and 126 are asymmetric, with face 124 being a longer vertical face and opposing face 126 being a shorter vertical face, but advantageously, each of light beams 161 and 162 has a reduced beam spread than the corresponding portions of the light from light source 15 before it reaches faces 124 and 126. Face 122 is both convex and tilted, so that divergence of light rays from light source 15 is reduced within light beam 160 than if face 122 were flat, and light beam 160 is directed away from nadir.

Light beams 161 and 162 traveling toward their respective sides are reflected by corresponding, upwardly-facing surfaces 130 and 132 to form reflected light beams 161' and 162' respectively. Surfaces 130 and/or 132 may reflect light beams 161 and 162 through total internal reflection, or may be coated with a reflective material (e.g., metal) to enhance reflection. Advantageously, surfaces 130 and 132 further reduce the beam spreads of light beams 161', 162' reflected therefrom, to facilitate further beam shaping with smaller and/or simpler optical surfaces. However, other embodiments do not reduce beam spread at surfaces like surfaces 130, 132. Because rays within each of light beams 161 and 162 forms a known distribution of angles at each point of incidence upon surfaces 130 and 132, surfaces 130 and 132 can be shaped to generate reflected light beams 161' and 162' into further, known distributions of angles. In the case of optic 110, light beams 161' and 162' are not necessarily collimated and do not travel in the same direction. Light beam 161' is slightly converging and substantially, but not completely, vertical (e.g., toward nadir), and light beam 162' is also slightly converging and at an angle of about 10 to 15 degrees from nadir.

Light beams 161' and 162' are thus substantially aimed by surfaces 130 and 132 toward downwardly-facing output surfaces 140 and 144, respectively. Given size constraints of optic 110, it may be desirable for light beams 161' and 162' not to necessarily map one-to-one with their respective output surfaces. For example, it can be seen that while light beam 161' substantially "fills" output surface 140, light beam 162' partially "underfills" output surface 144 on one side.

Upon passing out of optic 110 through respective output surfaces 140 and 144, light beams 161' and 162' are again refracted to form output light beams 161" and 162", as shown. In optic 110, output surface 140 is flat so as to refract light beam 161' but maintain its convergence in output beam 162". Output surface 144 is slightly concave so as to refract light beam 162' and reduce its convergence in output beam 162".

Like light beams 161' and 162', light beam 160 includes rays at a known distribution of angles caused by the refraction of rays from light source 15 through input surface 122. As can be seen in FIG. 6, despite the convex shape of input surface 122, light beam 160 is divergent. Light beam 160 is further refracted by output surface 142, which is slightly convex to reduce the divergence of light beam 160, as output beam 160' is formed.

Light beam 160 partially "overfills" output surface 142 on one side, and intersects transition surface 152, as shown. Light beams 164 and 164' resulting from the portion of light beam 160 that intersects transition surface 152 are shown. Light beam 164 first reflects from transition surface 152, then refracts through output surface 142, while light beam 164' refracts directly out of transition surface 152. Light beams 164, 164' may be advantageous in that they provide a small portion of light at angles that are at least twenty, and preferably thirty degrees, different from center rays of output beams 160', 161" and 162". Thus, light beams 164, 164' will provide a small amount of ambient light, in addition to light within a primary output lobe 165 (shown in FIG. 6B, and described below). In other embodiments, all transition surfaces (e.g., 150, 152 and the like) are positioned so that relatively little light reaches them, that is, substantially all of the light from light source 15 reaches only output surfaces (e.g., 140, 142, 144 and the like).

Center ray angles of light beams light beams 160', 161" and 162" are about 17, 28 and 29 degrees from nadir, respectively, and the average direction in which the combined energy of light beams 160', 161" and 162" is emitted, is about 23 degrees from nadir.

Figure 6B:
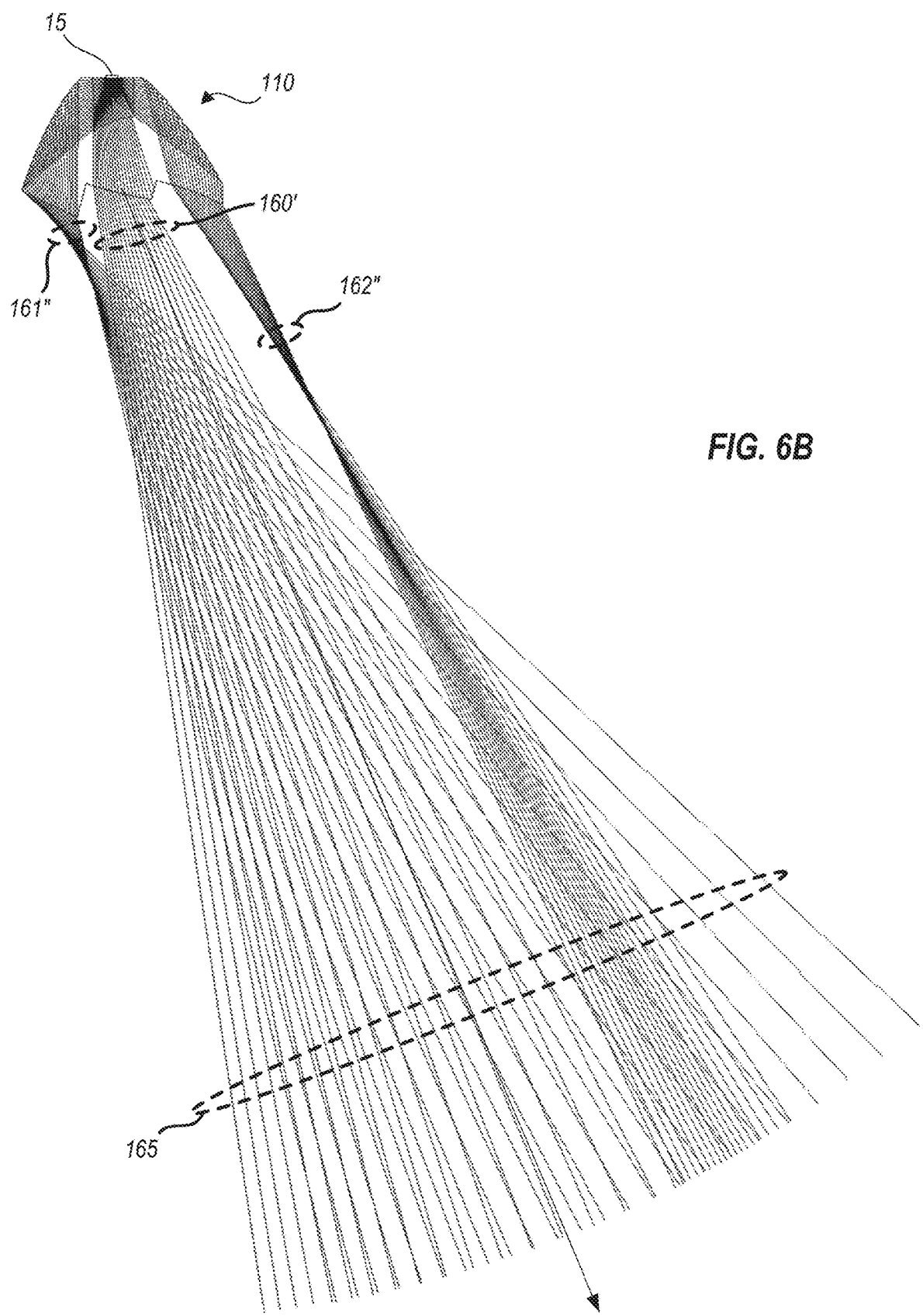
FIG. 6B is an extended raytrace diagram illustrating performance of the optic of FIGS. 5 and 6A, at a reduced magnification relative to FIG. 6A.

FIG. 6B is an extended raytrace diagram illustrating performance of optic 110, at a reduced magnification relative to FIG. 6A, showing light beams 160', 161" and 162" emitted therefrom. Light beams 160', 161" and 162" effectively combine into an output lobe 165. A center ray angle of output lobe 165 is about 23 degrees from nadir.

Figure 7:
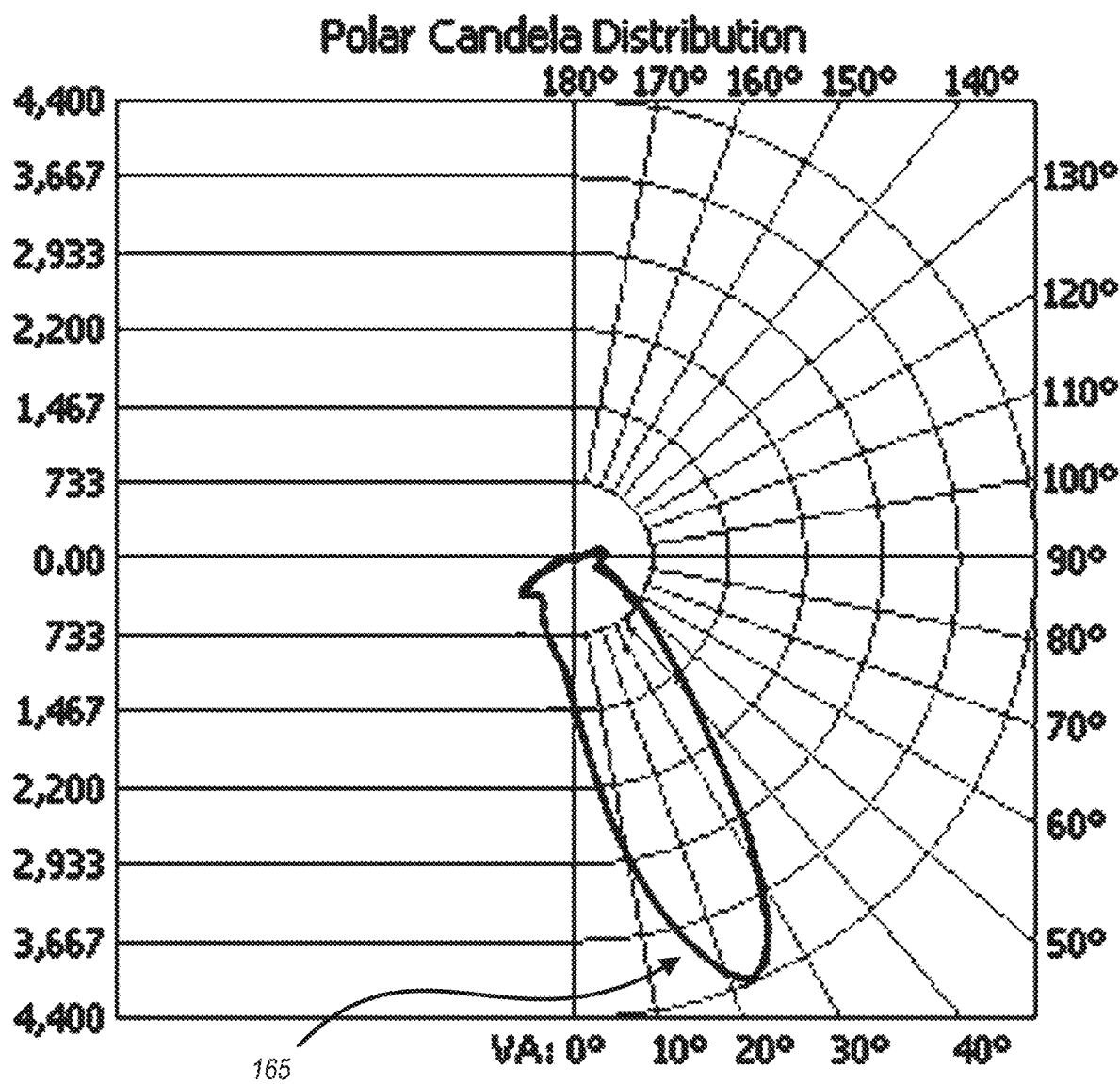
FIG. 7 is a polar plot of an intensity distribution created when a light source emits light that is redirected by the optic of FIG. 5.

FIG. 7 is a polar plot of an intensity distribution created when light source 15 emits light that is redirected by optic 110, as illustrated in FIGS. 5, 6A and 6B. As noted above, the intensity peaks at about 23 degree on one side of nadir.

Figure 8:
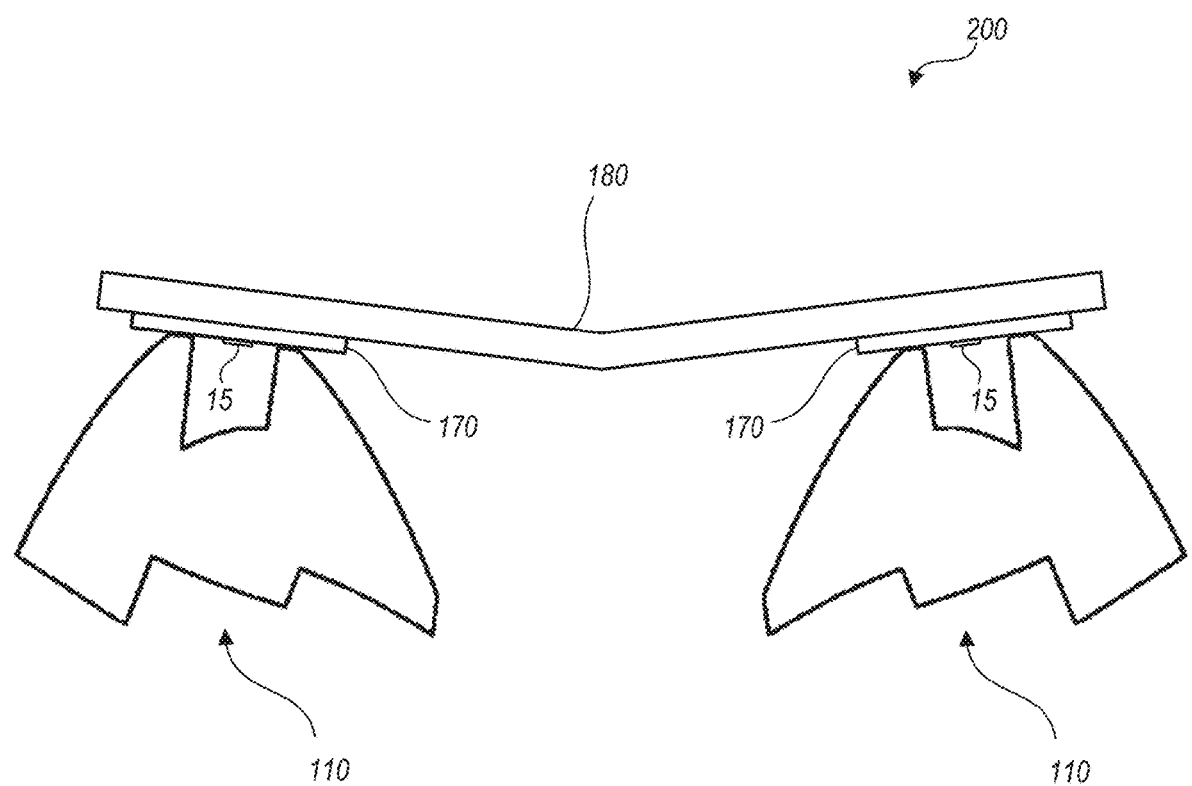
FIG. 8 schematically illustrates an arrangement that includes two of the optics of FIG. 5 to generate a narrow-aisle light distribution, according to one or more embodiments.
Figure 9:
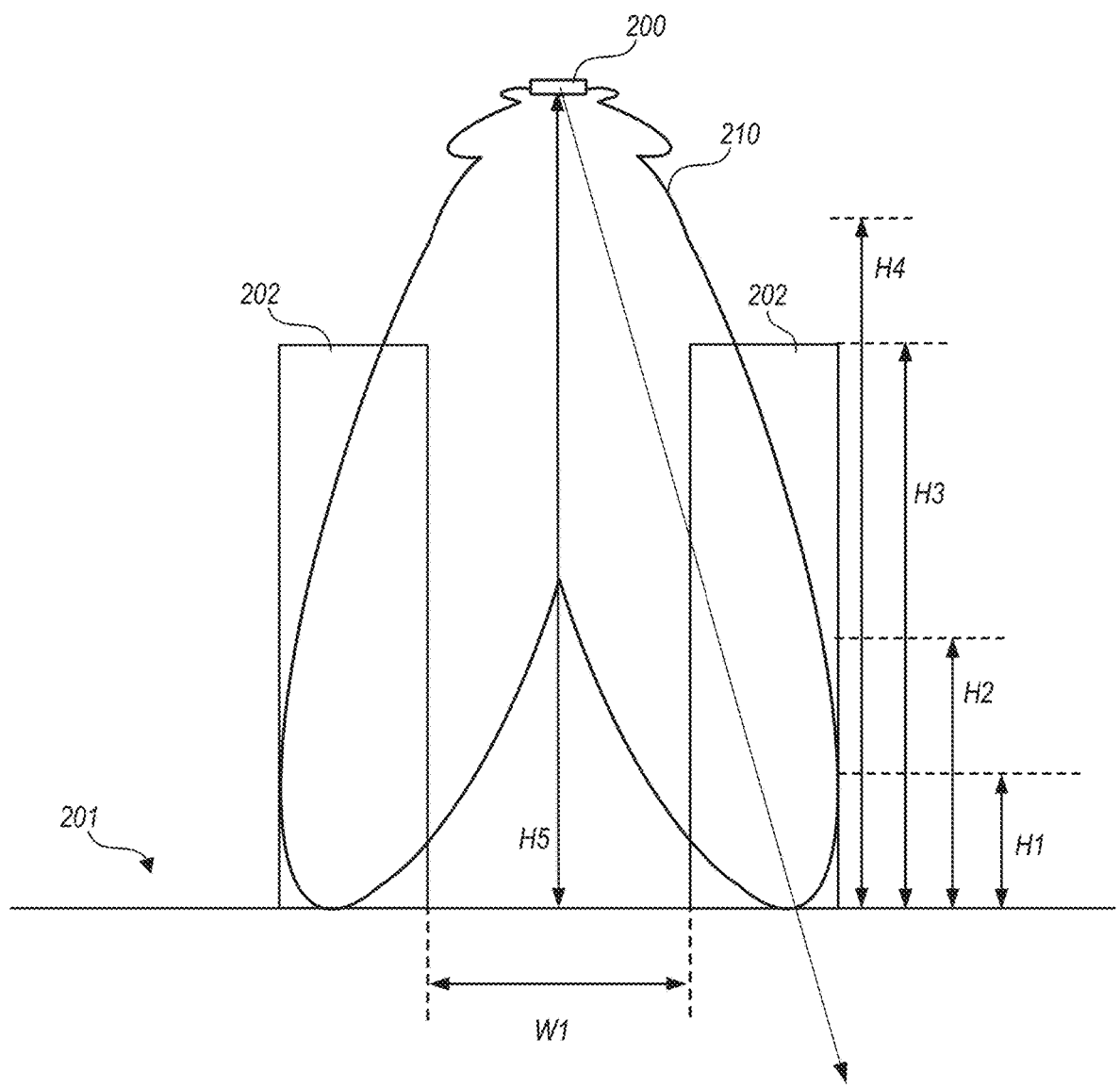
FIG. 9 schematically illustrates a net light distribution provided by the arrangement shown in FIG. 8.

It is possible to utilize either optic 10 or 110 discussed above in light fixtures that take advantage of the strong directionality of light generated thereby, and modify the resulting light distribution further by tilting the optic and its associated light source. For example, FIG. 8 schematically illustrates an arrangement 200 of two light fixtures, each including optics 110, to generate a narrow-aisle light distribution. Two optics 110 are each coupled with a respective printed circuit board (PCB) 170 on which a light source 15 is mounted. PCBs 170 and optics 110 are further coupled with a bracket 180 that provides a tilt to PCBs 170, light sources 15 and optics 110. Each optic 110 provides the distribution shown in FIG. 7, but is tilted at an angle of about 7 degrees so that each of the resulting light distributions has a net angle of about 16 degrees above nadir. FIG. 9 schematically illustrates a net light distribution 210 provided by arrangement 200 as shown in FIG. 8, against a possible aisle layout. Arrangement 200 is positioned at the location noted, suspended at a height of 23 feet above a floor 201. Arrangement 200 is centered over an aisle formed by two shelving units separated by a width W1 of 7 feet. As noted in connection with FIG. 1, zones of shelving units 202 are defined as zone 1 being within a height H1 between floor 201 and four feet above the floor; zone 2 being between height H1 and a height H2 of eight feet above the floor; zone 3 being between height H2 and a height H3 of sixteen feet above the floor; and a storage zone 4 being between height H3 and a height of twenty feet above the floor. As shown by the overlap of distribution 210 over shelves 202, arrangement 200 provides good light coverage in the important zones 2 and 3, and some coverage of the storage zone and zone 1. Advantageously, little light is provided directly to the floor area, so as not to provide glare to viewers or customers in the aisle. Light reflecting from shelves 202, and goods thereon, will provide adequate light for foot traffic.

Upon reading and comprehending the present disclosure, one of ordinary skill in the art will readily conceive many equivalents, extensions, and alternatives. In particular, embodiments of the linear optics herein can be optimized to provide symmetric and/or asymmetric light distributions along a length, such as along an aisle. The embodiments can, for example, be optimized to provide light at specific heights above a floor surface of the aisle, and to avoid excessive light to the floor itself, where it may be form undesirable glare.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described, are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:
1. An optic for aisle lighting, comprising:
   a portion of an optical material defined by a length and a cross-sectional profile orthogonal to the length, wherein the cross-sectional profile is characterized by:
   an upper side of the cross-sectional profile forming a cavity within the optical material, the cavity being bounded by
   an upward facing aperture, and three faces of the optical material that meet at interior angles, such that when light is received through the upward facing aperture of the cavity, the light is separated at the interior angles, and refracted by the faces of the optical material, into three separate light beams;

and wherein a first face of the faces of the optical material extends along a bottom of the cavity, and is arranged such that the first face of the optical material reduces a beam spread of a first light beam of the three separate light beams that are refracted therethrough; and second and third faces of the faces of the optical material are planar and substantially vertical faces of the optical material that face one another across the cavity, with each of the second and third faces adjoining the first face along the bottom of the cavity, the second and third faces being arranged so as to reduce beam spreads of corresponding second and third light beams of the three separate light beams refracted therethrough; and the cross-sectional profile being further characterized by:

two upwardly-facing surfaces of the optical material on opposite sides of the cavity from one another, each of the two upwardly-facing surfaces being configured to internally reflect respective ones of the separate light beams downwardly, as compared with their original directions, the two upwardly-facing surfaces of the optical material being sufficiently curved so as to further reduce the beam spreads of the corresponding second and third light beams as the light beams reflect from the upwardly-facing surfaces; and a plurality of downwardly-facing surfaces of the optical material, arranged such that each of the downwardly-facing surfaces intercepts at least a portion of one of the separate light beams, and refracts the portion of the one of the separate light beams as it exits the optic, and wherein:

first and second ones of the downwardly-facing surfaces meet at an angle, so as to provide different center ray angles for first and second portions of the first light beam, as they exit the optic; and the first and second ones of the downwardly-facing surfaces are curved surfaces arranged to further reduce beam spreads of the first and second portions of the first light beam, as compared to beam spreads of the first and second portions of the first light beam, as refracted by the first face of the optical material.

2. The optic of claim 1, wherein the two upwardly-facing surfaces of the optical material on opposite sides of the cavity from one another are coated with a reflective material.

3. The optic of claim 1, wherein:
the first face of the optical material is a planar horizontal surface, and
the second and third faces of the optical material adjoin the first face of the optical material at angles of eighty degrees to one hundred ten degrees.

4. The optic of claim 1, wherein the first and second ones of the downwardly-facing surfaces are arranged to substantially collimate each of the first and second portions of the first light beam, and to refract the first and second portions of the first light beam so that the different center ray angles are at least ten degrees different from one another, as the first and second portions of the first light beam exit the optic.

5. The optic of claim 4, wherein:
the cross-sectional profile is bilaterally symmetric, such that the center ray angle of the first portion of the first light beam, is equal and horizontally opposite to the center ray angle of the second portion of the first light beam.

6. An optic for aisle lighting, comprising:
a portion of an optical material defined by a length and a cross-sectional profile orthogonal to the length, wherein the cross-sectional profile is characterized by:
an upper side of the cross-sectional profile forming a cavity within the optical material, the cavity being bounded by
an upward facing aperture, and
three faces of the optical material that meet at interior angles,
such that when light is received through the upward facing aperture of the cavity, the light is separated at the interior angles, and refracted by the faces of the optical material, into three separate light beams, and wherein:
a first face of the three faces of the optical material extends along a bottom of the cavity, and is arranged such that the first face of the optical material reduces a beam spread of a first light beam of the three separate light beams that is refracted therethrough; and
second and third faces of the faces of the optical material are planar and substantially vertical faces of the optical material that face one another across the cavity, with each of the second and third faces adjoining the first face along the bottom of the cavity, the second and third faces being arranged so as to reduce beam spreads of corresponding second and third light beams of the three separate light beams refracted therethrough;
the cross-sectional profile being further characterized by:
two upwardly-facing surfaces of the optical material on opposite sides of the cavity from one another, each of the two upwardly-facing surfaces being configured to internally reflect respective ones of the separate light beams downwardly, as compared with their original directions,
and wherein the two upwardly-facing surfaces of the optical material are sufficiently curved so as to further reduce the beam spreads of the corresponding second and third light beams as the light beams reflect from the upwardly-facing surfaces, and
each of the upwardly-facing surfaces is arranged so as to substantially collimate the second and third light beams within the optic as they propagate downwardly; and
a plurality of downwardly-facing surfaces of the optical material, arranged such that each of the downwardly-facing surfaces intercepts at least a portion of one of the separate light beams, and refracts the portion of the one of the separate light beams as it exits the optic, and wherein:
first and second ones of the downwardly-facing surfaces meet at an angle, so as to provide different center ray angles for first and second portions of the first light beam, as they exit the optic; and are arranged to substantially collimate each of the first and second portions of the first light beam, and to refract the first and second portions of the first light beam so that the different center ray angles are at least ten degrees different from one another, as the first and second portions of the first light beam exit the optic; and third and fourth ones of the downwardly-facing surfaces are substantially planar surfaces that are arranged so as to refract the second and third light beams, as they exit the optic, into respective output angles from nadir that are substantially the same as the center ray angles of the first and second portions of the first light beam, respectively.

7. An optic for aisle lighting, comprising:

a portion of an optical material defined by a length and a cross-sectional profile orthogonal to the length, wherein the cross-sectional profile is characterized by:

an upper side of the cross-sectional profile forming a cavity within the optical material, the cavity being bounded by an upward facing aperture, and three faces of the optical material that meet at interior angles, such that when light is received through the upward facing aperture of the cavity, the light is separated at the interior angles, and refracted by the faces of the optical material, into three separate light beams, and wherein:

a first face of the three faces of the optical material extends along a bottom of the cavity, and is arranged such that the first face of the optical material reduces a beam spread of a first light beam of the three separate light beams that is refracted therethrough; and second and third faces of the faces of the optical material are planar and substantially vertical faces of the optical material that face one another across the cavity, with each of the second and third faces adjoining the first face along the bottom of the cavity, the second and third faces being arranged so as to reduce beam spreads of corresponding second and third light beams of the three separate light beams refracted therethrough;

the cross-sectional profile being further characterized by:

two upwardly-facing surfaces of the optical material on opposite sides of the cavity from one another, each of the two upwardly-facing surfaces being configured to internally reflect respective ones of the separate light beams downwardly, as compared with their original directions, and wherein the two upwardly-facing surfaces of the optical material are sufficiently curved so as to further reduce the beam spreads of the corresponding second and third light beams as the light beams reflect from the upwardly-facing surfaces; and a plurality of downwardly-facing surfaces of the optical material, arranged such that each of the downwardly-facing surfaces intercepts at least a portion of one of the separate light beams, and refracts the portion of the one of the separate light beams as it exits the optic, wherein first and second ones of the downwardly-facing surfaces meet at an angle, so as to provide different center ray angles for first and second portions of the first light beam, as they exit the optic, and are arranged to substantially collimate each of the first and second portions of the first light beam, and to refract the first and second portions of the first light beam so that the different center ray angles are at least ten degrees different from one another, as the first and second portions of the first light beam exit the optic;

and wherein, when a light source provides the light at a center of the upward facing aperture:

the optic substantially redirects a first half of the light from the light source into:

the second light beam, and the first portion of the first light beam, which, together, form a first output lobe that is centered from fifteen to forty degrees above nadir, and is characterized by a full width at half maximum of less than twenty degrees; and the optic substantially redirects a second half of the light from the light source into:

the third light beam, and the second portion of the first light beam, which, together, form a second output lobe that is centered from fifteen to forty degrees from nadir in an opposite horizontal direction from the first output lobe, and is characterized by a full width at half maximum of less than twenty degrees.

8. The optic of claim 7, wherein each of the first and second output lobes provides a peak intensity that is at least six times an intensity provided at nadir.

9. A method of providing light for an illuminated space, comprising:

providing a linear light source that is configured to emit light downwardly;

providing a linear optic, comprising an optical material that defines a length and a cross-sectional profile orthogonal to the length, wherein the cross-sectional profile is characterized by:

an upper side of the cross-sectional profile forming a cavity within the optical material, the cavity being bounded by:

an upward facing aperture, and at least first, second, and third faces of the optical material that meet at interior angles, wherein the first face corresponds with a bottom of the cavity, an optical axis of the optic passes vertically downward from a center of the upward facing aperture through the first face, and the second and third faces correspond with sides of the cavity, such that when light is received through the upward facing aperture of the cavity, the light is separated at the interior angles, and refracted by the first, second, and third faces of the optical material, into first, second, and third light beams, respectively;

the upper side of the cross-sectional profile further comprising first and second upwardly-facing surfaces of the optical material, on opposite sides of the cavity from one another, each of the first and second upwardly-facing surfaces being:

angled to internally reflect respective ones of the first and second light beams downwardly within the optical material, and convex upward, with a curvature that substantially collimates the reflected first and second light beams within the optical material;

a lower side of the cross-sectional profile comprising at least first, second, third and fourth downwardly-facing surfaces of the optical material, wherein:

the first and second downwardly-facing surfaces are disposed beneath the first face of the optical material so as to receive the first light beam, the first and second downwardly-facing surfaces meet at the optical axis, at a nonzero angle so as to separate the first light beam into two first light beam portions, each of the first and second downwardly-facing surfaces is downwardly convex, with curvatures that substantially collimate each of the first light beam portions as they exit the optic, each of the first and second downwardly-facing surfaces is angled, so as to refract the first light beam portions into exit angles that are at least ten degrees from nadir, on opposite sides of the optical axis, and the third and fourth downwardly-facing surfaces are planar surfaces disposed beneath the first and second upwardly-facing surfaces, and are angled so as to refract the internally collimated second and third light beams outwardly, at exit angles from nadir on both sides of the optical axis that are substantially identical to the exit angles of the first light beam portions, the second and third light beams remaining collimated as they exit the optic.

10. An optic for aisle lighting, comprising:

a portion of an optical material defined by a length and a cross-sectional profile orthogonal to the length, wherein the cross-sectional profile is characterized by:

an upper side of the cross-sectional profile forming a cavity within the optical material, the cavity being bounded by:

an upward facing aperture, and at least first, second, and third faces of the optical material that meet at interior angles, wherein the first face corresponds with a bottom of the cavity, an optical axis of the optic passes vertically downward from a center of the upward facing aperture through the first face, and the second and third faces correspond with sides of the cavity, such that when light is received through the upward facing aperture of the cavity, the light is separated at the interior angles, and refracted by the first, second, and third faces of the optical material, into first, second, and third light beams, respectively;

the upper side of the cross-sectional profile further comprising first and second upwardly-facing surfaces of the optical material, on opposite sides of the cavity from one another, each of the first and second upwardly-facing surfaces being:

angled to internally reflect respective ones of the first and second light beams downwardly within the optical material, and convex upward, with a curvature that substantially collimates the reflected first and second light beams within the optical material;

a lower side of the cross-sectional profile comprising at least first, second, third and fourth downwardly-facing surfaces of the optical material, wherein:

the first and second downwardly-facing surfaces are disposed beneath the first face of the optical material so as to receive the first light beam, the first and second downwardly-facing surfaces meet at the optical axis, at a nonzero angle so as to separate the first light beam into two first light beam portions, each of the first and second downwardly-facing surfaces is downwardly convex, with curvatures that substantially collimate each of the first light beam portions as they exit the optic, each of the first and second downwardly-facing surfaces is angled so as to refract the first light beam portions into exit angles that are at least ten degrees from nadir, on opposite sides of the optical axis, and the third and fourth downwardly-facing surfaces are planar surfaces disposed beneath the first and second upwardly-facing surfaces and are angled so as to refract the internally collimated second and third light beams outwardly, at exit angles from nadir on both sides of the optical axis that are substantially identical to the exit angles of the first light beam portions, the second and third light beams remaining collimated as they exit the optic.

\* \* \* \* \*